(12) United States Patent  
Zhou

(10) Patent No.: US 8,732,243 B2  
(45) Date of Patent: May 20, 2014

(54) METHOD AND SYSTEM FOR APPLICATION LAYER LINK CONTROL

(75) Inventor: Shijun Zhou, Guangdong (CN)

(73) Assignee: ZTE Corporation, Shenzhen (CN)

( * ) Notice: Subject to any disclaimer, the term of this patent is extended or adjusted under 35 U.S.C. 154(b) by 59 days.

(21) Appl. No.: 13/377,113

(22) PCT Filed: Sep. 15, 2009

(86) PCT No.: PCT/CN2009/073948
§ 371 (c)(1),
(2), (4) Date: Dec. 8, 2011

(87) PCT Pub. No.: WO2010/142094
PCT Pub. Date: Dec. 16, 2010

(65) Prior Publication Data
US 2012/0079030 A1    Mar. 29, 2012

(30) Foreign Application Priority Data

Jun. 12, 2009    (CN) .......................... 2009 1 0107992

(51) Int. Cl.
*G06F 15/16* (2006.01)
(52) U.S. Cl.
USPC ............ 709/204; 709/206; 709/227; 709/228
(58) Field of Classification Search
USPC .................................. 709/204, 206, 227, 228
See application file for complete search history.

(56) References Cited

U.S. PATENT DOCUMENTS

| 7,137,144 | B1 * | 11/2006 | Attwood et al. ................ 726/13 |
| 2002/0181401 | A1 * | 12/2002 | Hagirahim et al. ........... 370/236 |
| 2003/0069933 | A1 * | 4/2003 | Lim et al. ...................... 709/206 |
| 2004/0097240 | A1 * | 5/2004 | Chen et al. .................... 455/450 |
| 2007/0190985 | A1 | 8/2007 | Bai et al. |

FOREIGN PATENT DOCUMENTS

| CN | 1738446 A | 2/2006 |
| CN | 101022356 A | 2/2006 |
| GB | 2404758 A | 2/2005 |
| JP | 2004343466 A | 12/2004 |

OTHER PUBLICATIONS

International Search Report dated Mar. 25, 2010 for PCT/CN2009/073948, filed Sep. 15, 2009.
International Preliminary Report on Patentability dated Dec. 12, 2011 for PCT/CN2009/073948, filed Sep. 15, 2009.
Supplementary European Search Report dated Jun. 5, 2013 for Application No. 09845703.9 in 5 pages.

* cited by examiner

*Primary Examiner* — Brian J Gillis
*Assistant Examiner* — Shean Tokuta
(74) *Attorney, Agent, or Firm* — Knobbe, Martens, Olson & Bear, LLP

(57) ABSTRACT

The present invention discloses a method and a system for application layer link control. The method comprises: judging whether the number "a" of links which have been established between an exterior IP and a multimedia messaging service gateway (MMSG) in current granularity is less than a threshold number "A" of links for establishing a connection with the MMSG in the current granularity (S1); if it is determined to be "yes", subtracting the "a" from the "A" to obtain a threshold number "B" of links for establishing a connection with the MMSG in a next granularity (S2), wherein B=A−a; and otherwise, obtaining the threshold number "B" of links for establishing a connection with the MMSG in the next granularity, wherein B=0, and rejecting a request that the exterior IP initiates to establish a connection with the MMSG in the next granularity. With the present invention, effective control for establishing a link with the MMSG is realized, the MMSG link resource is distributed fairly and perfect distribution of the link resource is realized.

6 Claims, 2 Drawing Sheets

METHOD AND SYSTEM FOR APPLICATION LAYER LINK CONTROL

CROSS-REFERENCE TO RELATED APPLICATIONS

This application is the U.S. National Phase application under 35 U.S.C. §371 of International Application PCT/CN2009/073948 filed Sep. 15, 2009, which claims priority to Chinese Application 200910107992.7 filed Jun. 12, 2009.

FIELD OF THE INVENTION

The present invention relates to the communication field, and in particular to a method and a system for application layer link control.

BACKGROUND OF THE INVENTION

With the development of multimedia messaging service (MMS), services of more and more global service providers (SP) successively access a multimedia messaging service gateway (MMSG) and are interconnected with the MMS through the MMSG.

In the above, the MMS is a messaging service which can transmit multimedia contents between cell phones, as well as between a cell phone and other communication terminal device such as an Email server. The MMSs are divided according to an operator to which a subscriber belongs and a region in which the subscriber is located, and are provided to the subscriber by an MMS center (MMSC) to which the subscriber belongs.

The SP is a direct provider of a mobile internet application service, and develops and provides a service suitable for a subscriber of the cell phone according to demands of the subscriber. Generally, the SP provides services to the subscriber by a telecommunication operator access channel.

The MMSG interconnects the MMSC with the SP by using an MM7 interface and distributes global single point SP services, with the purpose of reducing forward traffic of an MM4 interface and improving overall processing capability of the present MMSC network.

For the MMSG, there is a huge number of exterior entities (e.g. SP); each of the exterior entities is communicated with the MMSG by creating an application layer link; moreover, in order to improve transmission efficiency of messages in the present network, a long link is generally applied; if link resources are not released for a long time, there is great loss of system performance of the MMSG; and if the number of links between each of the exterior entities and the MMSG is increased limitlessly, the MMSG is to collapse in severe cases.

In addition, a plurality of service processors forming the MMSG have to be subjected to F5 load balancing during the communication with the exterior entities; and each of the service processors is configured with a maximum number of link connections. When an exterior entity initiates a link establishment request to the plurality of service processors of the MMSG respectively, if some service processors have established relatively more links while other service processors have established relatively less links, and the number of links that the request initiates to establish is not greater than the number of the link connections that all the service processors can bear, then the service processors which have established relatively more links will reject the establishment request with the number of links exceeding the maximum number of the link connections of the service processors; while in the situation that the number of links that the request initiates to establish is not greater than the number of the link connections that all the service processors can bear, the link establishment request is nevertheless rejected, thus the MMSG link resource can not be allocated perfectly.

SUMMARY OF THE INVENTION

The technical problems to be solved by the present invention are the problems such as imperfect allocation of MMSG link resources, and MMSG collapse caused by too many links established between an exterior entity (such as SP) and an MMSG; therefore the present invention provides a method and a system for application layer link control to solve the problems.

The method for application layer link control according to the present invention comprises the following steps of:

judging whether the number "a" of links which have been established between an exterior internet protocol (IP) and a multimedia messaging service gateway (MMSG) in current granularity is less than a threshold number "A" of links for establishing a connection with the MMSG in the current granularity; if it is determined to be "yes", subtracting the "a" from the "A" to obtain a threshold number "B" of links for establishing a connection with the MMSG in a next granularity, wherein B=A−a; and otherwise, obtaining the threshold number "B" of links for establishing a connection with the MMSG in the next granularity, wherein B=0, and rejecting a request that the exterior IP initiates to establish a connection with the MMSG in the next granularity.

In the above method, the "a" is the sum of the numbers of links which have been established between the exterior IP and each service processor forming the MMSG respectively.

In the above method, the "A" is a preset threshold number of links for establishing a connection between the exterior IP and the MMSG, or a threshold number of links for establishing connections between the exterior IP and the MMSG in a previous granularity.

The above method also comprises: in the next granularity, the exterior IP initiating a request to establish "c" links with the MMSG with the "c" not greater than the "B"; the MMSG accepting the request and establishes links.

The above method also comprises: in the next granularity, the exterior IP initiating a request to establish "d" links with the MMSG with the "d" greater than the "B", the MMSG accepting to establish "B" links with the exterior IP but rejecting a request to establish links in the number greater than "B".

The system for application layer link control according to the present invention comprises: an MMSG and a link control module connected with the MMSG; wherein the link control module is configured to calculate the number "a" of links which has be established between an exterior IP and the MMSG in current granularity, and to judge whether the "a" is less than a threshold number "A" of links for establishing a connection with the MMSG in the current granularity; if it is determined to be "yes", the link control module subtracts the "a" from the "A" so as to obtain a threshold number "B" of links for establishing a connection with the MMSG in a next granularity, wherein B=A−a; otherwise, the link control module obtains the threshold number "B" of the links for establishing a connection with the MMSG in the next granularity, wherein B=0, and controls the MMSG to reject a request that the exterior IP initiates for establishing a connection with the MMSG in the next granularity.

In the above system, the MMSG comprises at least one service processor; and the service processor is configured, according to the "A", to accept requests to establish "A" links and to reject requests to establish connections in the number greater than "A".

In the above system, the link control module comprises a timing calculation distribution sub-module; and the timing calculation distribution sub-module is configured to perform addition on the numbers of links which have been established between a same exterior IP and the service processor in the current granularity to obtain the "a", and then to compare the "a" with the "A" to obtain the "B".

In the above system, the link control module further comprises a collecting information sub-module; and the collecting information sub-module is configured to receive the number of links which have been established between the same exterior IP and the service processor in the current granularity, wherein the number is sent from the service processor, and to send the number to the timing calculation distribution sub-module.

In the above system, the MMSG is also configured to receive, in the next granularity, a request that the exterior IP initiates to establish a connection, and to judge whether the number of links of the request is not greater than the "B"; if it is determined to be "yes", the MMSG accepts a request to establish "A" links, and otherwise, only to accept to establish "A" links but to reject the request to establish connections in the number greater than "A".

Compared with the existing art, with the method and the system for application link control according to the present invention, the numbers of links which have been established in each granularity are collected and calculated, wherein the numbers are sent by individual service processors, and then it is determined whether to accept the link establishment request according to the threshold number of links (i.e., the threshold of the number of links) for establishing a connection with the MMSG in each corresponding granularity. Specifically, the request to establish the threshold number of links is accepted and the request to establish links in the number more than the threshold number is rejected. By the above solution, effective control for establishing a link with the MMSG is realized, the MMSG link resources are allocated fairly and perfect allocation of the link resources is realized. In addition, the threshold number of links for establishing a connection with the MMSG is set, which effectively protects the MMSG against collapse due to establishing too many links.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE INVENTION

Functional Overview

Considering the problem in the existing art, the embodiments of the present invention provide a solution for application layer link control. The processing principle of the solution comprises: judging whether the number "a" of links which have been established between an exterior internet protocol (IP) and a multimedia messaging service gateway (MMSG) in current granularity is less than a threshold number "A" of links for establishing a connection with the MMSG in the current granularity; if it is determined to be "yes", subtracting the "a" from the "A" to obtain a threshold number "B" of links for establishing a connection with the MMSG in a next granularity, wherein B=A−a; and otherwise, obtaining the threshold number "B" of links for establishing a connection with the MMSG in the next granularity, wherein B=0; and rejecting in the next granularity a request which is initiated by the exterior IP to establish a connection with the MMSG. With the solution, effective control for establishing a link with the MMSG is realized, MMSG link resources are allocated fairly and perfect allocation of the link resource is realized.

The method and the system for application layer link control provided by the present invention are described hereinafter by reference to the accompanying drawings.

Method Embodiment

Figure 1:
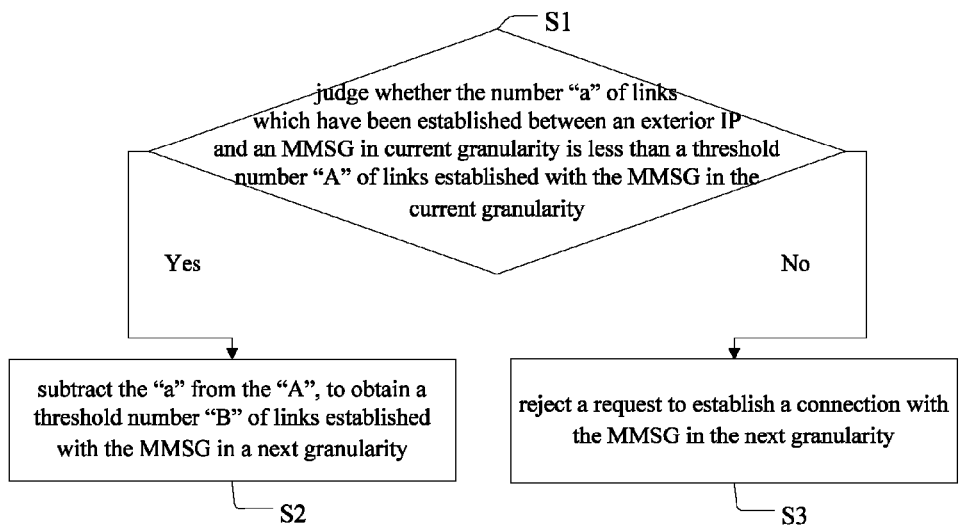
FIG. 1 is a flowchart of a method for application layer link control according to the embodiments of the present invention.

The embodiments of the present invention provide a method for application layer link control. FIG. 1 is a flowchart of the method for application layer link control according to the embodiments of the invention, wherein the method comprises the following steps S1 to S3.

S1: It is judged whether the number "a" of links which have been established between an exterior IP and an MMSG in current granularity is less than a threshold number "A" of links established with the MMSG in the current granularity, wherein if it is determined to be "yes", S2 is executed, and otherwise, S3 is executed.

S2: The "a" is subtracted from the "A", so as to obtain a threshold number "B" of links established with the MMSG in a next granularity.

S3: The request to establish a connection with the MMSG is rejected in the next granularity.

Figure 2:
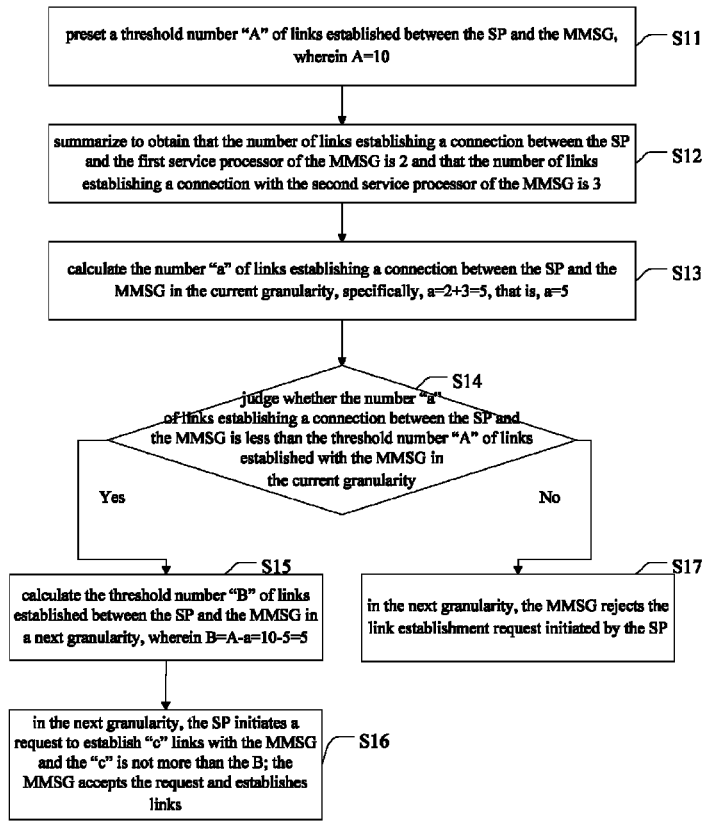
FIG. 2 is a detailed flowchart of a method for application layer link control according to the embodiments of the present invention.

Hereinafter, an exterior IP corresponding to an SP is taken as an example to illustrate the present invention; and it is assumed that the MMSG comprises two service processors, i.e., a first service processor and a second service processor. FIG. 2 is a detailed flowchart of a method for application layer link control according to the embodiments of the invention. As shown in FIG. 2, the method comprises the following steps S11 to S17.

S11: A threshold number "A" of links established between the SP and the MMSG is preset, wherein A=10. Besides, the "A" may also be obtained by the method for application layer link control in a previous granularity.

S12: It is obtained by collection, in the current granularity, that the number of links establishing a connection between the SP and the first service processor of the MMSG is 2, and that the number of links establishing a connection with the second service processor of the MMSG is 3.

S13: The number "a" of links which have been established between the SP and the MMSG in the current granularity is calculated, specifically, a=2+3=5.

S14: It is judged whether the number "a" of links which have been established between the SP and the MMSG is less than the threshold number "A" of links established with the MMSG in the current granularity, wherein if it is determined to be "yes", that is, 5<10, S15 is executed, and otherwise, S17 is executed.

S15: The threshold number "B" of links established between the SP and the MMSG in a next granularity is calculated, wherein B=A−a=10−5=5. It is indicated that maximum number of links established between the SP and the MMSG is 5 in the next granularity.

S16: In the next granularity, the SP initiates a request to establish "c" links with the MMSG and the "c" is not greater than the "B", the MMSG accepts the request and establishes links. Besides, in the next granularity, the SP may also initiate a request to establish "d" links with the MMSG and the "d" is greater than the "B", the MMSG accepts to establish "B" links with the SP but rejects the request to establish more than "B" links.

S17: In the next granularity, the MMSG rejects the link establishment request initiated by the SP.

According to the embodiments of the invention, a computer readable medium is also provided. Computer executable instructions are stored in the computer readable medium. When the instructions are executed by a computer or a processor, the computer or the processor processes according to the steps shown in FIG. 1 and FIG. 2. Preferably, the computer or the processor can execute one or more of the above embodiments.

System Embodiment

Figure 3:
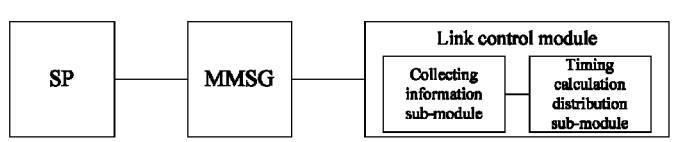
FIG. 3 is a module schematic diagram of a system for application layer link control according to the embodiments of the present invention.

The embodiments of the present invention also provide a system for application layer link control. FIG. 3 is a module schematic diagram of the system for application layer link control according to the embodiments of the invention. As shown in FIG. 3, the system comprises: an SP, an MMSG and a link control module.

In the above, the SP is configured to initiate a request to establish links with the MMSG.

The MMSG comprises at least one service processor, the service processor is configured, according to the threshold number of links established with the MMSG in current granularity, to accept or reject the request that the SP initiates for establishing links with the MMSG. If the number of links of the request that the SP initiates to establish links with the MMSG is less than the threshold number, the service processor accepts the request that the SP initiates for establishing links with the MMSG; and if the number of links of the request that the SP initiates to establish links with the MMSG is greater than the threshold number, the service processor only accepts to establish the threshold number of links but rejects the request to establish links in the number greater than the threshold number. In addition, each service processor can process, according to preset allocation rules, the request that a same SP initiates to establish links with the MMSG.

The link control module is connected with the MMSG and comprises a collecting information sub-module and a timing calculation distribution sub-module, wherein the collecting information sub-module is configured to receive the number of links which have been established between the IP and the service processor in each granularity, wherein the link number is sent by each service processor; and the timing calculation distribution sub-module is configured to calculate data received by the collecting information sub-module and to perform addition on numbers of links which have been established between a same IP and each service processor in the granularity to obtain the number of links which have been established between the SP and the MMSG in the granularity, and then to compare this number with the threshold number of links established between the SP and the MMSG in the granularity to obtain a total number of links that each service processor can accept for the SP in a next granularity, that is, the threshold number of links established between the SP and the MMSG in the next granularity.

Compared with the existing art, in the method and the system for application link control provided by the embodiments of the invention, effective control for establishing a link with the MMSG is realized, the MMSG link resources are fairly assigned and perfect allocation of the link resources is realized, by adopting the link control module to collect and calculate the number of links which have been established in each granularity (wherein the number of links is sent by each service processor), and accepting the request to establish the threshold number of links and reject the request to establish the links in the number greater than the threshold number, according to the link threshold number for establishing a connection with the MMSG in each corresponding granularity. In addition, the threshold number of links for establishing a connection with the MMSG is set, which effectively protects the MMSG against collapse due to establishing too many links.

In addition, the implementation of the present invention does not modify the system framework or the current process; and the present invention is easy to implement, convenient to popularize in the technical field, and has strong industrial applicability.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for application layer link control, comprising the following steps:
   judging whether the number "a" of links which have been established between an exterior internet protocol (IP) entity and a multimedia messaging service gateway (MMSG) in current granularity is less than a threshold number "A" of links for establishing a connection with the MMSG in the current granularity;
   when it is determined to be "yes", subtracting the "a" from the "A" to obtain a threshold number "B" of links for establishing a connection with the MMSG in a next granularity, wherein B=A−a; and
   otherwise, obtaining that the threshold number "B" of links for establishing a connection with the MMSG in the next granularity equals 0, and rejecting a request that the exterior IP entity initiates to establish a connection with the MMSG in the next granularity,
   wherein the "a" is the sum of the number of links which have been established between the exterior IP entity and each service processor forming the MMSG respectively, and
   wherein the "A" is a preset threshold number of links for establishing a connection between the exterior IP entity and the MMSG in a previous granularity.

2. The method according to claim 1, wherein the method further comprises:
   in the next granularity, the exterior IP entity initiating a request to establish "c" links with the MMSG with the "c" not greater than the "B"; the MMSG accepting the request and establishes links.

3. The method according to claim 1, wherein the method further comprises:
   in the next granularity, the exterior IP entity initiating a request to establish "d" links with the MMSG with the "d" greater than the "B", the MMSG accepting to establish "B" links with the exterior IP entity but rejecting a request to establish links in the number greater than "B".

4. A system for application layer link control, comprising an MMSG, the system further comprising a link control module connected with the MMSG, wherein the link control module comprises a processor, wherein the link control module is configured to calculate the number "a" of links which has be established between an exterior IP entity and the MMSG in current granularity, and to judge whether the "a" is less than a threshold number "A" of links for establishing a connection with the MMSG in the current granularity; when it is determined to be "yes", the link control module subtracts the "a" from the "A" so as to obtain a threshold number "B" of links for establishing a connection with the MMSG in a next granularity, wherein B=A−a; otherwise, the link control module obtains that the threshold number "B" of the links for establishing a connection with the MMSG in the next granularity equals 0, and controls the MMSG to reject a request that the exterior IP entity initiates for establishing a connection with the MMSG in the next granularity, wherein the MMSG comprises at least one service processor; and the service processor is configured, according to the "A", to accept requests to establish "A" links and to reject requests to establish connections in the number greater than "A", wherein the link control module comprises a timing calculation distribution sub-module; and the timing calculation distribution sub-module is configured to perform addition on the numbers of links which have been established between a same exterior IP entity and the service processor in the current granularity to obtain the "a", and then to compare the "a" with the "A" to obtain the "B", and wherein "A" is a preset threshold number of links for establishing a connection between the exterior IP entity and the MMSG in a previous granularity.

5. The system according to claim 4, wherein the link control module further comprises a collecting information sub-module; and the collecting information sub-module is configured to receive the number of links which have been established between the same exterior IP entity and the service processor in the current granularity, wherein the number is sent from the service processor, and to send the number to the timing calculation distribution sub-module.

6. The system according to claim 4, wherein the MMSG is further configured to receive, in the next granularity, a request that the exterior IP entity initiates to establish a connection, and to judge whether a number of "c" links of the request is not greater than the "B"; if it is determined to be "yes", the MMSG accepts a request to establish "c" links, and otherwise, only to accept to establish "B" links but to reject the request to establish connections in the number greater than "B".

* * * * *